US009944404B1

(12) United States Patent
Gentry

(10) Patent No.: US 9,944,404 B1
(45) Date of Patent: Apr. 17, 2018

(54) PROGNOSTIC FAILURE DETECTION SYSTEM

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 14/666,144

(22) Filed: Mar. 23, 2015

(51) Int. Cl.
| | | |
|---|---|---|
| *B64D 45/00* | (2006.01) | |
| *G07C 5/08* | (2006.01) | |
| *G01M 17/00* | (2006.01) | |

(52) U.S. Cl.
CPC ............ *B64D 45/00* (2013.01); *G01M 17/00* (2013.01); *G07C 5/0808* (2013.01); *G07C 5/0841* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 8,452,475 B1 * | 5/2013 | West | ...................... | G07C 5/006 701/29.1 |
| 8,620,714 B2 | 12/2013 | Williams et al. | | |
| 2007/0252029 A1 * | 11/2007 | Karem | ................. | G08G 5/0021 244/1 R |
| 2008/0125933 A1 * | 5/2008 | Williams | ............... | G06Q 10/08 701/29.5 |
| 2009/0182515 A1 * | 7/2009 | Pado | .................... | G01M 5/0066 702/36 |
| 2014/0316616 A1 * | 10/2014 | Kugelmass | ............ | G05D 1/101 701/8 |
| 2015/0344149 A1 * | 12/2015 | Mumaw | ............. | G05B 23/0251 701/33.4 |
| 2016/0117933 A1 * | 4/2016 | Chan | .................... | G08G 5/0069 705/317 |
| 2016/0124434 A1 * | 5/2016 | Gariepy | ............... | G05D 1/0297 701/23 |
| 2016/0259337 A1 * | 9/2016 | Ruffier | ................. | G05D 1/0094 |
| 2016/0260265 A1 * | 9/2016 | Buehler | ................ | G08C 25/00 |

\* cited by examiner

*Primary Examiner* — James M McPherson
(74) *Attorney, Agent, or Firm* — Lee & Hayes, PLLC

(57) ABSTRACT

A prognostic failure detection system may be implemented for an unmanned aerial vehicle(s) (UAV). A prognostic failure detection system may include a process of predicting failure conditions that may affect an UAV physical system or structure before they occur. By predicting failure conditions before they occur, the prognostic system allows maintenance centers to perform corrective actions in a timely and cost-effective manner. The prognostic system is intended to monitor and support the functionality of several physical systems and physical structures associated with an UAV. A physical system includes, but is not limited to, the electrical system, power system including the power supply, motor and propeller assemblies including motor controllers, navigation system, and flight controller system.

20 Claims, 10 Drawing Sheets

US 9,944,404 B1

PROGNOSTIC FAILURE DETECTION SYSTEM

BACKGROUND

The operation and maintenance of unmanned aerial vehicle(s) (UAV) can be economically burdensome. Historically, traditional aircraft and rotorcraft have employed preventative maintenance techniques to help control maintenance costs. Preventative maintenance solutionsam2 1759US, also known as prognostic detection systems, can only be implemented when there is a sound knowledge of the failure mechanisms that are likely to cause the degradations that eventually lead to failures in the systems. Thus, it is necessary to identify system parameters and initial information on possible failures (include failure sites, modes, causes and mechanisms) to implement an effective prognostic detection system. An understanding of system parameters and initial information is generally achievable based on historical trends. As a relatively new technology, UAVs lack such a historical account of failure sites, modes, causes, and mechanisms.

BRIEF DESCRIPTION OF THE DRAWINGS

The detailed description is described with reference to the accompanying figures. In the figures, the left-most digit(s) of the reference number identifies the figure in which the reference number first appears. The same reference numbers in different figures indicate similar or identical items.

FIG. 2A is a top plan view of the UAV. FIG. 2B is a side elevation view of the UAV.

DETAILED DESCRIPTION

Figure 1:
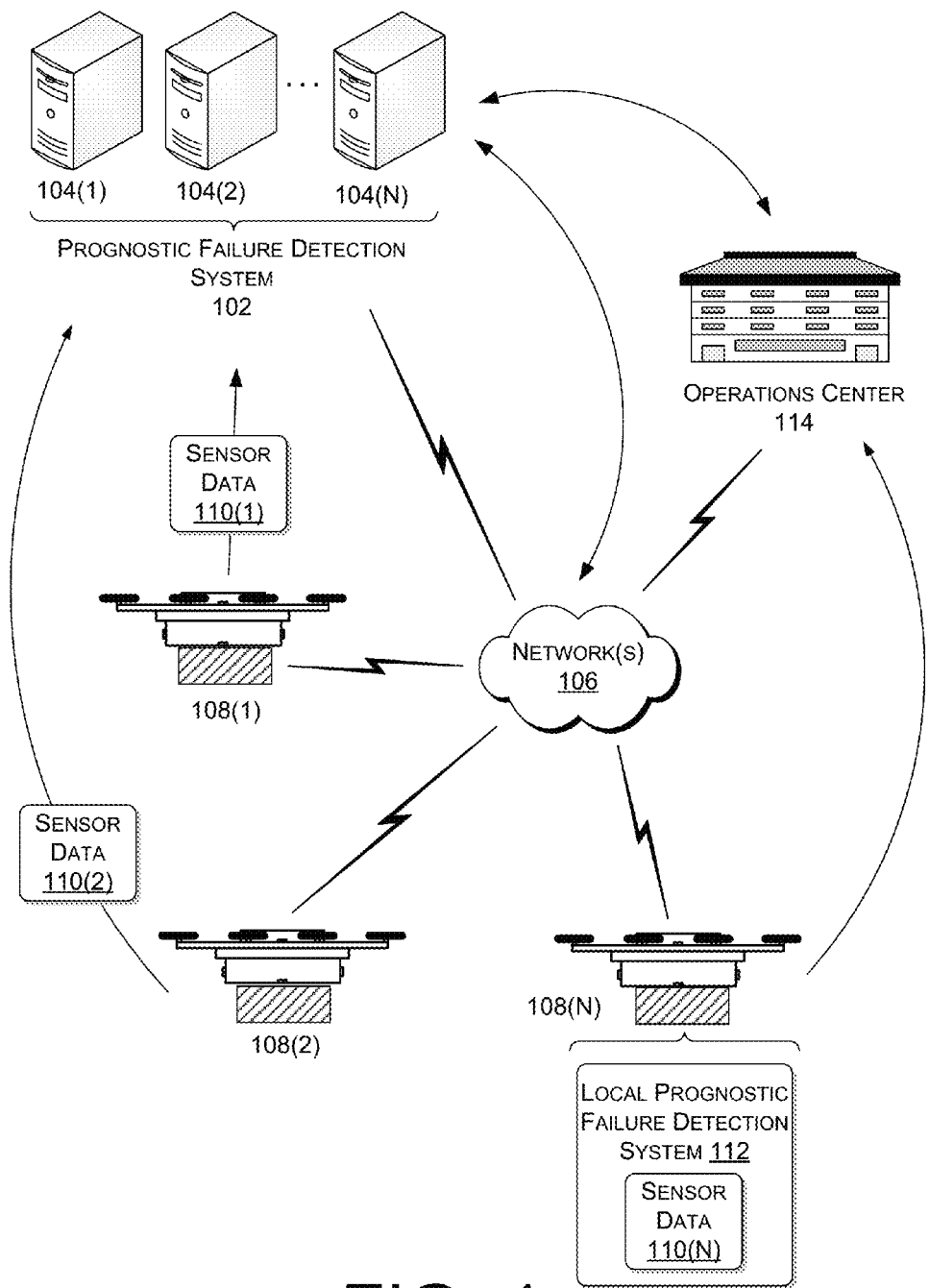
FIG. 1 is a schematic diagram depicting an example environment for implementing the prognostic failure detection system.

This disclosure provides methods and systems for implementing a prognostic failure detection system on unmanned aerial vehicle(s) (UAV). A prognostic failure detection system (hereinafter referred to as "prognostic system") relates to a process of predicting failure conditions that may affect an UAV physical system or structure before they occur. By predicting failure conditions before they occur, the prognostic system allows maintenance centers to perform corrective actions in a timely and cost-effective manner. The prognostic system is intended to monitor and support the functionality of several physical systems and physical structures associated with an UAV. The term physical system, as described herein, is used to describe system-specific features of an UAV. For example, a physical system includes, but is not limited to, the electrical system, power system including the power supply, motor and propeller assemblies including motor controllers, navigation system, and flight controller system. The term physical structure, as described herein, is used to describe the fuselage and adjoining structure that forms the UAV. In various examples, the UAV may include a fuselage comprising one or more structures (or spars). The one or more structures can include open-section structures, such as I-beams, U-beams, and flat plates. In other embodiments, the one or more structures may include closed-sections having, circular, square, rectangular, or any other closed-shaped cross-section.

In various embodiments, the prognostic system is tasked with identifying a failure condition associated with a physical system or physical structure that may occur during a phase of flight. In some embodiments, the prognostic system may identify the failure condition during a phase of flight of the UAV. In other embodiments, the prognostic system may identify the failure condition during ground level testing of the UAV. The phases of flight include take-off, climb, cruise, descent, and landing. In some embodiments, a failure condition associated with a physical system can describe a complete failure of a physical system, an intermittent failure of the physical system or an operation of the physical system outside a calibrated system-specific operating range. Moreover, a failure condition associated with a physical structure can describe a complete tensile or compressive failure of a physical structure, a yielding of the physical structure, or a partial tensile or compressive failure of the physical structure. In some embodiments, a failure condition associated with a physical structure may also describe a partial or complete failure of a joint that is interfacing between two or more structural members.

In various examples, the prognostic system includes a plurality of sensors that monitor the functionality of physical systems and physical structures installed on an UAV. The prognostic system can acquire sensor data from each sensor, and process the sensor data to determine whether the physical system or physical structure is performing within its intended operational parameters.

In various embodiments, the prognostic system adopts a statistical approach to processing the sensor data. In the event that the prognostic system determines that a failure condition may occur, to alleviate the risk of further damage to the UAV. In some embodiments, the prognostic system may cause a message to be transmitted to a maintenance center identifying the failure condition. In other embodiments, the prognostic system may modify a maintenance plan associated with the UAV to schedule a corrective action. In various embodiments, the prognostic system may impose a restriction on continued flight until the corrective action has been performed.

FIG. 1 is a block diagram depicting an example environment for implementing the prognostic system 102. In some examples, the prognostic system 102 includes distributed computing resources 104 that can communicate with one another and with external devices via one or more network(s) 106.

For example, the one or more network(s) 106 can include public networks such as the Internet, private networks such as an institutional and/or personal intranet, or some combination of private and public networks. Network(s) can also include any type of wired and/or wireless network, including but not limited to local area network (LANs), wide area networks (WANs), satellite networks, cable networks, Wi-Fi network, WiMax networks, mobile communications networks (e.g. 3G, 4G, and so forth), Bluetooth or near field communication (NFC) networks, or any combination thereof.

In the illustrated implementation, the UAV 108 may transmit sensor data 110 to a prognostic system 102 via the one or more network(s) 106. In other embodiments, the UAV 108 may interact with a prognostic system 112 that is stored locally on the UAV 108. In some embodiments, the local prognostic system 112 can correspond to the prognostic system 102.

In some embodiments, the prognostic system 112 or 102 can also communicate with an operations center 114, either directly or via the one or more network(s) 106. The operations center 114 is tasked with supporting the operation of the UAV(s) 108 by maintaining the operational integrity of the UAV 108 physical systems and physical structures. In various examples, the operations center 114 may also include the fulfillment and distribution processing of inventory that the UAV(s) 108 are tasked with transporting.

Figure 2A:
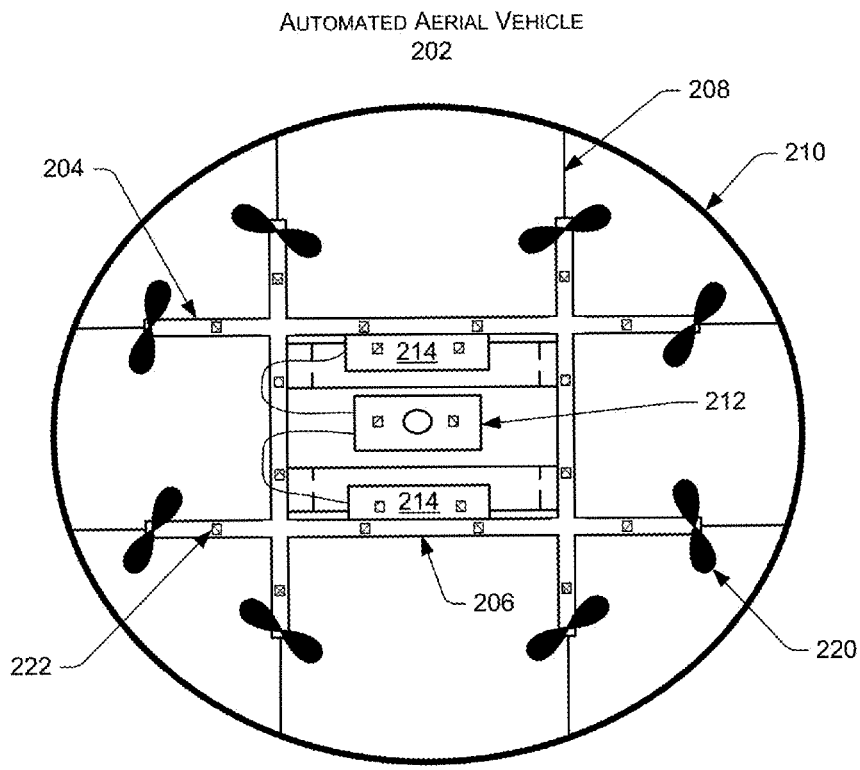
FIGS. 2A and 2B illustrate the physical systems and the physical structure of an example unmanned aerial vehicle (UAV).
Figure 2B:
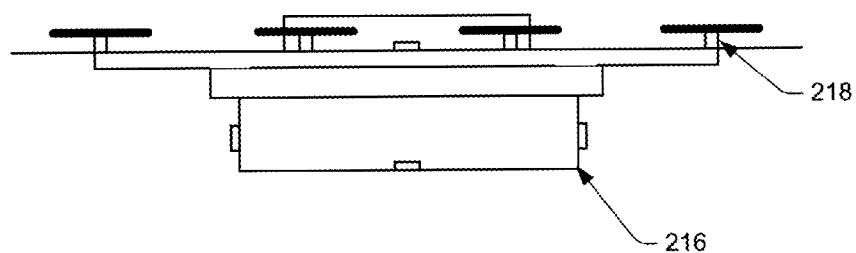

FIGS. 2A and 2B illustrate an example UAV 202. In various examples, UAV 202 can correspond to UAV 108. UAV 202 may be a winged-craft, a rotorcraft, or a hybrid aircraft that is capable of transporting inventory by air from an origination location to a destination location.

In various examples, the UAV 202 may include a physical structure. The physical structure may include one or more spars 204, a support frame(s) 206, support arms 208, and a barrier 210. The physical structure can include open-section structures, such as I-beams, U-beams, and flat plates (not shown). In other embodiments, the physical structure may include closed-sections having, circular, square, rectangular, or any other closed-shaped cross-section (not shown).

The UAV 202 may also include physical systems, such as a control system 212 and one or more power module(s) 214. The control system 212 may control the operation, routing, navigation, and the inventory engagement mechanism 216. The power module(s) 214 are coupled to and provide power for the UAV control system 212 and the electric motors 218 that power the propellers 220.

The one or more power module(s) 214 may be removably mounted to the support frame 206. The power module(s) 214 may be in the form of battery power, solar power, gas power, super capacitor, fuel cell, alternative power generation source, or a combination thereof.

As mentioned above, the UAV 202 may also include an inventory mechanism 216. The inventory mechanism 216 may be configured to engage and disengage items and/or containers that hold items.

In various examples, the UAV 202 may include a plurality of sensors 222 that interface with the various physical structures and physical systems of the UAV 202. The sensors 222 are tasked with monitoring the operation and functionality of the physical structures and the physical systems.

Figure 3:
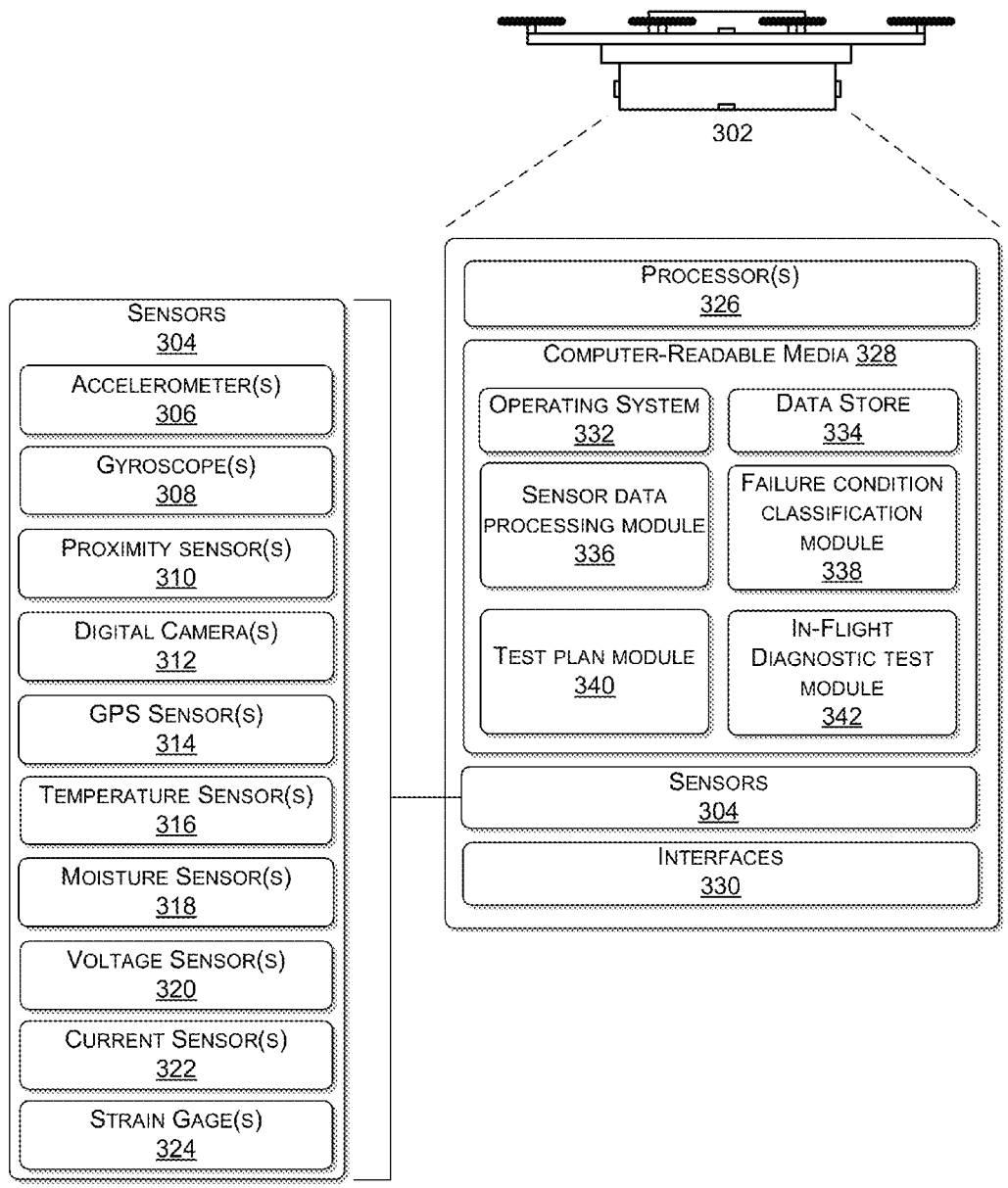
FIG. 3 is a block diagram of components of an example unmanned aerial vehicle that is supported by the prognostic failure detection system.

FIG. 3 illustrates an example UAV 302 that is supported by the prognostic system. In various examples, UAV 302 can correspond to UAV 108 and UAV 202. UAV 302 may be equipment with sensors 304 that monitor the operation and functionality of the physical structures and the physical systems. The sensors 304 can correspond to sensors 222. The sensors 304 can include, but are not limited to, accelerometer(s) 306, gyroscope(s) 308, proximity sensor(s) 310, digital camera(s) 312, global positioning system (GPS) sensor(s) 314, temperature sensor(s) 316, moisture sensor(s) 318, voltage sensor(s) 320, current sensor(s) 322, and strain gauges 324.

In various embodiments, accelerometer(s) 306 can be used monitor translational and rotational movements of the UAV 302 in at least some of the six degrees of freedom (6-DOF). In other embodiments, the accelerometer(s) 306 may be used to monitor the relative translational/rotational movements of specific components of the UAV 302. For example, accelerometer(s) 306 can be used to monitor the deflection of UAV 302 propellers due to vibration. In other embodiments, accelerometer(s) 306 can be used in pairs to determine flight stabilization characteristics of the UAV 302. For example, a pair of accelerometer(s) 306 can be installed at separate and opposing ends of the UAV 302. Flight stabilization characteristics of the UAV 302 can subsequently be determined by processing the difference in acceleration that is determined by each accelerometer 302 within the pair.

In some embodiments, proximity sensor(s) 310 and/or the digital camera(s) 312 can be used to measure translational movement along a particular axis. In some embodiments, the proximity sensor(s) 310 and/or digital camera(s) 312 can monitor vibration of physical structures, by monitoring an out of plane deflection. In other embodiments, proximity sensor(s) 310 and/or digital camera(s) 312 can be used to monitor the attachment of inventory to the UAV 302. For example, if inventory is not securely fastened to the UAV 302, proximity sensor(s) 310 and/or digital camera(s) 312 may identify a change in distance between the UAV 302 and its inventory.

In some embodiments, temperature sensor(s) 316 can be used to monitor the temperature of electric motors and motor driver controllers. In various examples, temperature sensor(s) 316 can also be included on CPU boards that correspond to one or more processor(s) 326 associated with the UAV 302.

In various examples, moisture sensor(s) 318 may monitor physical systems of the UAV 302 that are exposed to the natural environment. A non-limiting example may comprise placing moisture sensor(s) 318 inside a flight controller casing to ensure that the integrity of the flight controller system is not compromised by corrosion caused by excessive moisture.

In some embodiments, voltage sensor(s) 320 and current sensor(s) 322 may monitor the electrical and power systems associated with the UAV 302 to ensure that sufficient power output is available to support the UAV 302 physical systems.

In some embodiments, strain gauge(s) 324 can be used to measure strain associated with physical structure of the UAV 302. In various examples, strain gauge(s) 324 can be installed on physical structure such as the UAV 302 fuselage to determine the change in strain (or displacement) of structure. In other embodiments, strain gauge(s) 324 can be used to determine other parameters that are directly proportional to strain, such as thrust. A non-limiting example may include installing strain gage(s) 324 onto support structure associated with an electric motor that is coupled to the UAV 302 propeller blades. The strain gage(s) 324 can be aligned with the electric motor drive shaft axis, such that the strain gage(s) 324 are parallel to the direction of thrust. In this instance, measured strains can be used to determine the real-time thrust of the propeller blade.

In some embodiments, the UAV 302 can include one or more processor(s) 326 operably connected to computer-readable media 328. The UAV 302 can also include one or more interfaces 330 to enable communication between the UAV 302 and other networked devices, such as the prognostic system 102. The one or more interfaces 330 can include network interface controllers (NICs), I/O interfaces, or other types of transceiver devices to send and receive communications over a network. For simplicity, other computers are omitted from the illustrated UAV 302.

The computer-readable media 328 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the computer-readable media 328 can include an operating system 332 and a data store 334. The data store 334 may be used to locally store sensor data that corresponds to sensor 304 measurements.

In various examples, the computer-readable media 328 can include a sensor data processing module 336. The sensor data processing module 336 can process sensor data associated with various physical systems and physical structures of the UAV 302. The sensor data processing module 336 also determines whether the various physical systems and physical structures are functioning normally. In various examples, the sensor data processing module 336 identifies physical systems and physical structures that are not functioning normally, and are considered likely subjects of a failure condition. In some embodiments, the sensor data processing module 336 may determine whether a physical system or physical structure is functioning normally by a comparing processed sensor data to historical trends of the same UAV 302 or a fleet of similar UAVs. In various examples, the historical trends may identify normal operating conditions of various physical systems and physical structures of the UAV. As a non-limiting example, historical trends of a power supply may indicate that a temperature increase of 'A' within a predetermined time period of 'B' is a normal 'temperature rate of change.' Therefore, if the sensor data processing module 336 processes sensor data that indicates a comparably higher 'temperature rate of change' on a power supply, the processed sensor data may be indicating a likely failure condition on the power supply.

As a non-limiting example, the sensor data processing module 336 can receive sensor data associated with an electrical system of the UAV 302. In this instance, the sensor data may correspond to data from temperature sensor(s) 316, moisture sensor(s) 320, voltage sensor(s) 320, and/or current sensor(s) 322. The sensor data processing module 336 may process the sensor data from these different sensor types to determine whether the electrical system of the UAV 302 is functioning properly. Moreover, the sensor data processing module 316 may determine a higher likelihood of a failure condition occurring when several different sensor types indicate a likely occurrence of the same failure condition.

For example, consider a temperature sensor 316, moisture sensor 318, and voltage sensor 320 monitoring the integrity of a power supply. The temperature sensor 316 may indicate that the power supply is overheating, thus implying the likelihood of an impending failure. Similarly, the voltage sensor 320 may sense a reduced power output from the power supply, which may further imply an impending failure. Moreover, a moisture sensor 318 may detect an accumulation of condensation within a battery compartment enclosure, which again, may suggest an impending failure of the power supply. While a single indication from any one of the temperature sensor 316, moisture sensor 318, or voltage sensor 320 may suggest a likelihood of an impending power supply failure, the sensor data processing module 336 can adjust the likelihood of an implied failure based on the accumulative effect of receiving multiple indications from these different sensor types.

In some embodiments, the sensor data processing module 336 can use sensor data to monitor the operation of physical systems, such as the thrust produced the electric motors, and the stability of the aircraft. For example, as discussed earlier, strain gauges 324 may be installed onto support structure of an electric motor to determine real-time thrust forces. The sensor data processing module 336 may subsequently determine whether all motor and propeller assemblies are developing a same level of thrust force, within a predetermined operational range.

Unlike traditional rotorcraft and aircraft, the UAV 302 is capable of carrying inventory that is comparably similar, if not greater than its own weight. In some instances, the distribution of weight can make the UAV 302 with inventory more susceptible to vibration problems for at least two reasons. Firstly, an UAV 302 with inventory and an UAV 302 without inventory have significantly different aerodynamic profiles, and thus may exhibit different vibration profiles during each phase of flight. In addition, since the UAV 302 and its inventory may be of comparable weight, the weight distribution and center of gravity (CG) position that corresponds to an UAV 302 with inventory and an UAV 302 without inventory can vary significantly. Changes in weight distribution can further affect an overall vibration profile of the UAV 302 during each phase of flight.

In various examples, to assist in monitoring the vibration profiles, strain gage(s) 324 can be installed at various locations on the physical structure of the UAV 302. The sensor data processing module 336 can process the strain gage(s) 324 data to determine real-time strain reversals that correspond to vibration frequencies of the physical structure. In some cases, the determined vibration frequency may indicate an abnormal level of vibration that may correspond to faulty damper isolators installed between the autopilot and the airframe. In those instances, the sensor data processing module 336 may determine that a real-time vibration frequency represents an impending failure condition of the physical structure.

In other embodiments, the sensor data processing module 336 may compare the determined vibration frequency with predetermined natural frequencies associated with the structure and/or other in-situ physical systems installed on the UAV 302. In instances where the determined vibration frequency is within a predetermined range of a predetermined natural frequency, the real-time operating condition of the UAV 302 may cause a sudden onset of dynamic instability, also known as flutter. Flutter may subsequently lead to catastrophic failure of a physical structure and loss of the UAV 302. The onset of dynamic stability, or flutter, may not necessarily follow a severe vibration event, but instead occur within a short instance of time. Thus, in these instances, the comparison of the determined vibration frequency with predetermined natural frequencies that is performed real-time by the sensor data processing module 336, can become an invaluable, and in some cases, only resource in avoiding mid-air dynamic instability.

In various examples, strain gauges 324 can also be installed on landing gear mechanisms of the UAV 302. For example, in the event that the UAV 302 experiences a hard landing, the strain gauges 324 may detect an abnormal rate of change of strain. The sensor data processing module 336 may determine that the abnormal rate of change of rate is the result of a hard landing. A hard landing is determined as a descent of the UAV 302 to a full stop at a rate that exceeds a predetermined threshold rate.

In some embodiments, the sensor data processing module 336 can monitor UAV 302 attitude (e.g. orientation) and level flight using sensor data from a suite of sensors 304. For example, accelerometers, proximity sensors, and gyroscopes can be used to detect a change in pitch, roll, yaw, and altitude that exceeds a predetermined limit. In instances where the UAV 302 attitude and level flight characteristics exceed predetermined limits, the sensor data processing module 336 may indicate that the control systems may be out of calibration. Alternatively, the sensor data may also indicate a problem with the autopilot, a motor assembly, or the flight control system, generally. In these instances, combining data from different sensor types may assist in isolating the root cause of the problem.

In other embodiments, the sensor data processing module 336 can also monitor the frequency of network dropouts associated with an UAV 302. An increase in the frequency of network dropouts above a predetermined threshold may indicate a problem with an UAV 302 network card or a cellular card.

In yet another embodiment, the sensor data processing module 336 can perform regular interval system checks to ensure that physical systems are functioning correctly. For example, a navigation system that includes a GPS unit can be tested in flight by comparing the output GPS co-ordinates with those of a known landmark. In instances, where a discrepancy exists, the diagnosis module 336 may indicate that the navigation system may require further testing or is not correctly calibrated. In some embodiments, a navigation system check can be performed during the landing phase of flight, where the landing site is a known landmark.

In various examples, the sensor data processing module 336 may compare sensor data from the UAV 302 to historical trends of the same UAV 302 or a fleet of similar UAVs. Based at least in part on the comparison, the sensor data processing module 336 can determine whether an a physical system or physical structure is operating normally. For example, temperature sensor data received from temperature sensor(s) 316 can be directly compared with historical trends of temperature values. However, in other embodiments, the sensor data processing module 412 may manipulate sensor data before making a comparison to historical trends. For example, the sensor data processing module 412 can use real-time strain reversal data from strain gauges attached to physical structure to determine a vibration frequency of the UAV structure. The sensor data processing module 412 may subsequently compare the determined vibration frequency to known historical trends of the same UAV or a fleet of similar UAVs.

In various examples, the computer-readable media 338 can also include a failure condition classification module 338 and a test plan module 340. In various examples, once the sensor data processing module 336 has processed the sensor data and determined that an operating condition that may lead to failure condition, the failure condition classification module 338 classifies the failure condition into one of three categories. The three categories include flight non-critical, flight critical, and flight critical priority. Once the failure condition has been classified, the test plan module 340 determines and executes a corrective action that is consistent with the failure condition classification.

A flight non-critical category classification means that the failure condition identified is unlikely to occur and that continued flight is unlikely to affect the integrity of the UAV 302. For example, an elevated temperature reading for a physical system that extends only marginally beyond a predetermined allowable temperature range may be classified as flight non-critical. The test plan module 340 may cause a message to be sent to an operations center 114 indicating the nature of the failure condition. In some embodiments, the test plan module 340 may modify the maintenance schedule that corresponds to the UAV 302 to schedule inspections or additional tests at predetermined time intervals to monitor the progress of the identified failure condition until a final corrective action is performed. Other flight non-critical category classifications may include, but are not limited to, minor detection of corrosion on flight non-critical components, infrequent network dropouts.

A flight critical category classification means that the failure condition identified is likely to occur. However, the UAV 302 can be safely operated within a restricted performance envelope. For example, consider a scenario in which two adjacent motors of an eight motors UAV 302 fail. In addition to reducing overall thrust capability by one quarter, the remaining motors may generate an asymmetric thrust that causes the UAV 302 to become unstable. In this instance, the test plan module 340 may determine that a failure condition is likely to occur and that correct action is required. The test plan module 340 may proportionally reduce thrust on electric motors that geometrically oppose the failed motors to correct any asymmetric thrust. In addition, if the test plan module 340 determines that the overall thrust force is capable of supporting the UAV 302 weight during the remaining phases of flight, the test plan module 340 may permit continued flight but modify the remaining flight plan to minimize the increase in thrust required from the remaining engines. In this instance, the test plan module 340 may cause a message to be sent to an operations center 114 indicating the nature of the failure condition. Other flight critical category classifications may include, but are not limited to, landing gear integrity following a hard landing, calibration of flight control system following a minor in-flight dynamic instability event, or calibration of the navigation system due to minor landing inaccuracies.

A flight critical priority category classification means that the failure condition identified is likely to occur, and the UAV 302 cannot operate safely in its current operating condition. For example, consider a scenario where strain gage data associated with the UAV 302 structure indicates that the vibration frequency of the structure is likely to cause a catastrophic failure of the UAV 302. In various examples, the test plan module 340 can implement a controlled emergency descent to land the UAV 302 and its inventory before catastrophic failure occurs. The test plan module 340 may further cause a message to be sent to an operations center 114 indicating the nature of the failure condition, and the location of the UAV 302 and its inventory. In some embodiments, the test plan module 340 may modify the maintenance schedule associated with the UAV 302 to include corrective actions that address the failure condition. In some embodiments, an UAV 302 with a flight critical priority category classification cannot be cleared for further flight without having the corrective action applied. Other flight critical category priority classifications may include, but are not limited to, determining that overall CG of the UAV 302 and its inventory is outside an allowable operational range, frequent network dropouts, consistently elevated temperature readings that correspond to an UAV 302 power supply, flight controller or navigation system or CPU processor.

In some embodiments, the test plan module 340 may modify the maintenance schedule associated with the UAV 302 to include additional ground tests or order replacement parts that address a determined failure condition. In some embodiments, where the test plan module 340 cannot schedule the corrective action within a predetermined time period, the test plan module 340 may modify the operational characteristics of the UAV 302 until the corrective action has been performed. By example only, the modified operational characteristics may include restricting the UAV 302 flight envelope (i.e. reduce cruise altitude, reduce cruise speed), imposing an inventory weight limit, or moving ballast (not shown) that is installed on the UAV 302 towards their outermost positions. By moving ballast outwards, the UAV 302 becomes less maneuverable, but is inherently more stable. In this instance, the UAV 302 may continue to fly, albeit with operational flight restrictions.

In some embodiments, the test plan module 340 may determine a priority list of ground test to perform on a UAV at the end of a flight cycle. In various examples, the sensor data processing module 336 may be unable to identify an affected physical system or an affected physical structure. In other embodiments, the sensor data processing module 336 may be unable to identify the failure condition itself. In these instances, the test plan module 340 may determine a list of ground tests that may assist in identifying the affected physical system or affected physical structure, or the failure condition based on the available sensor data. In various examples, the list of ground tests may be prioritized by factors including, but not limited to, the time available to perform the ground tests. For example, the UAV may have a short on-ground turn-around time before its next flight cycle, or inventory delivery. In those instances, the test plan module 340 may prioritize first, the ground tests most likely to identify the affected physical system or affected physical structure.

In some embodiments, the test plan module 340 may identify in-flight diagnostic checks to identify an affected physical system or an affected physical structure of a failure condition. In other embodiments, the test plan module 340 may identify in-flight diagnostic checks to identify the failure condition itself, if the failure condition cannot be cannot be clearly identified from the UAV sensor data.

In various examples, the computer-readable media 338 may include an in-flight diagnostic test module 342. The in-flight diagnostic test module 342 may perform in-flight diagnostic checks on physical systems associated with the UAV 302. The diagnostic checks are intended to ensure that the physical systems associated with the UAV 302 are functioning normally. In some embodiments, the diagnostic checks may be prescribed by the test plan module 340 when the affected physical system or affected physical structure associated with a failure condition is unclear. In yet another embodiment, diagnostic checks may be prescribed by the test plan module 340 when the failure condition cannot be clearly identified from the UAV sensor data.

In other embodiments, the in-flight diagnostic test module 342 may perform routine diagnostic checks during each flight cycle. In some embodiments, a routine diagnostic check may include verifying the operational center of gravity (CG) of the UAV and its inventory. As a non-limiting example, the operational CG of the UAV can be determined during a straight and level hover phase of flight. During this phase of flight, the operational CG corresponds to the centroid of the individual thrust vectors associated with each motor of the UAV. Other diagnostic checks may involve verifying the performance of individual motors that power the propellers. By example only, these diagnostic checks may involve running the UAV 302 motors at a predetermined thrust levels, and verifying that the resultant thrust vector across all motors is symmetrical. In other examples, only a symmetrical selection of motors may be operated at predetermined thrust increments.

Other diagnostic checks may include determining a vibration frequency of the UAV 302 structure at predetermined thrust output levels, verifying the accuracy of the navigation system by comparing coordinates of a known landmark with a determined GPS coordinates, or verifying dynamic stability during a climb and cruise phase of flight by conducting controlled pitch, roll and yaw maneuvers during each respective phase of flight.

The diagnostic checks may be conducted during any phase of flight. For example, verifying motor performance may be appropriately conducted during a climbing phase after the UAV has delivered its inventory. Similarly, determining the operational CG is most appropriately conducted immediately after take-off phase of the UAV with its inventory, and prior to commencing the initial climbing phase.

In some embodiments, the in-flight diagnostic test module 342 may use predetermined mission constraints or an environmental awareness to determine whether to conduct a diagnostic check or to select a particular phase of flight in which to conduct the diagnostic check. For example, predetermined mission constraints may include, but are not limited to, factors affecting energy resources, and available time. For example, the performance of a diagnostic check during a phase of flight may depend on energy resources available on the UAV 302, energy resources required to complete the current flight cycle, and the additional energy resources required to complete the diagnostic check. Similarly, factors affecting available time may include whether the UAV 302 has a short on-ground turn-around time before it is required to commence its next flight cycle, or in some cases inventory delivery. Moreover, an environmental awareness may include, but is not limited to, weather conditions and terrain contours of geographic regions where the UAV 302 intends to perform the diagnostic checks. An additional factor may include the populace of geographic regions.

In various embodiments, the in-flight diagnostic test module 342 may access sensor data associated with the sensors 304. The in-flight diagnostic test module 342 may process the sensor data to determine whether the diagnostic check performed has identified an operating condition that may lead to a failure condition. In the event that the diagnostic checks do not identify an impending failure condition, the UAV 302 may continue to operate within its prescribed operational parameters. However, if a failure condition is identified, the failure condition classification module 338 may appropriately classifies the failure condition. Thereafter, the test plan module 340 may impose an in-flight corrective action, cause a message to be sent to an operations center 114 indicating the nature of the diagnostic check failure condition, and in some cases modify the maintenance plan of the UAV 302 by scheduling a correction action.

Figure 4:
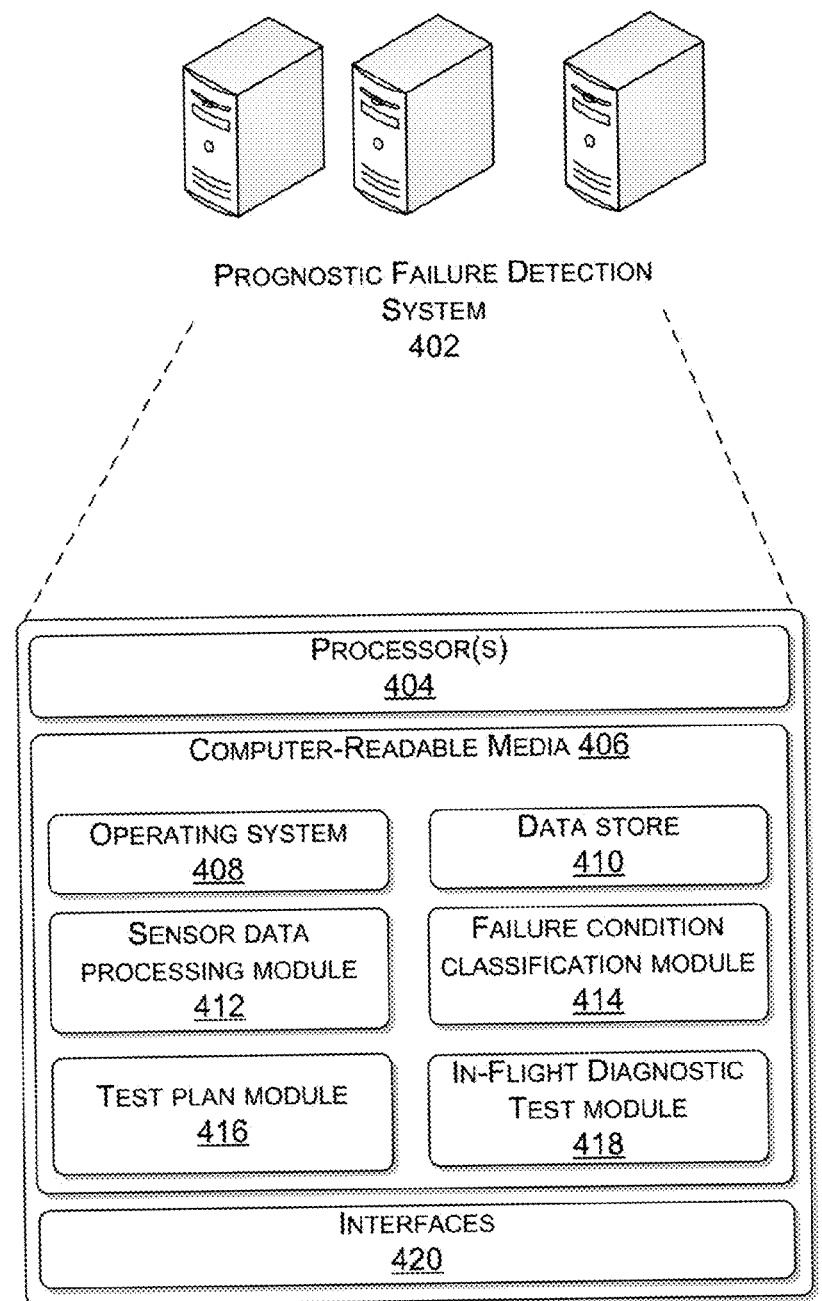
FIG. 4 is a block diagram of an example prognostic failure detection system.

FIG. 4 illustrates an example prognostic system 402. In various examples, prognostic system 402 can correspond to the prognostic system 102. The prognostic system 402 may include one or more processor(s) 404 that interact with the computer-readable media 406. In various examples, the one or more processor(s) 404 and computer readable media 406 can correspond to the one or more processors 326 and computer-readable media 328 associated with the UAV 302. The computer-readable media 406 may include an operating system 408 and a data store 410 to store sensor data received from an UAV. The computer-readable media 406 may also include software programs or other executable modules that may executed by the one or more processor(s) 404. Examples of such programs or modules include, but are not limited to, sensor algorithms, network connection software, control modules and power management systems.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. An implementation of these modules and techniques may be stored on or transmitted across some form of computer-readable media.

In various embodiments, the computer-readable media 406 may include a sensor data processing module 412. The sensor data processing module 412 can correspond to sensor data processing module 336 of UAV 302. The functionality of the sensor data processing module 412 is substantially identical to the sensor data processing module 336. In some embodiments, the sensor processing module 412 receives processed sensor data from the sensor data processing module 336. In other embodiments, the sensor processing module 412 and the sensor data processing module 336 of the UAV 302 may operate simultaneously. In this instance, the processing derived by either one of the sensor processing module 412 or the sensor data processing module 336 can be used to check the processing determined by the other. In various examples, the processing of sensor data may be performed solely by the either the sensor data processing module 336 or the sensor data processing module 418.

In various examples, the sensor data processing module 412 may request sensor data from a data store on a UAV at predetermined time intervals during a flight cycle of the UAV. In some embodiments, the predetermined time intervals may be equal across all phases of flight. In other embodiments, the predetermined time intervals may vary based on the phase of flight. For example, during a take-off phase of flight, the sensor data processing module 412 may request sensor data at shorter time intervals relative to a request during a cruise phase of flight. In other embodiments, sensor data may be transmitted from the UAV without receiving a request from the sensor data processing module 412. For example, sensor data may be transmitted to the sensor data processing module 412 based on a distance travelled by the UAV, an altitude attained, or at a predetermined energy resource level. In yet another embodiment, the UAV can transmit sensor data to the sensor data processing module 412 in response to registering a sensor reading beyond a predetermined operating range.

Similarly, as described earlier in relation to the sensor data processing module 336, the sensor data processing module 412 may combine sensor data from one or more different types of sensors to determine whether an existing operating condition may lead to a failure condition. The combination of sensor data may also be used to narrow the cause of a possible failure condition. For example, consider a scenario of an UAV experiencing dynamic instability. The test plan module may use sensor data from a gyroscope and a plurality of accelerometers to determine that the UAV is dynamically unstable. In addition, the sensor data processing module 412 may further consider sensor data from strain gauges 324 attached the physical structure of the UAV to ascertain whether the dynamic instability is due to the vibration frequency of the structure. Moreover, the sensor data processing module 412 may further consider sensor data from strain gauges 324 attached to electric motors coupled to the UAV propellers to ascertain whether the dynamic instability is partly due to asymmetric thrust.

In various embodiments, the computer-readable media 406 may include a failure condition classification module 414. The failure condition classification module 414 can correspond to the failure classification module 338 of UAV 302.

In various embodiments, the computer-readable media 406 may include a test plan module 416. The test plan module 416 may correspond to the test plan module 340 of UAV 302.

In various embodiments, the computer-readable media 406 may include an in-flight diagnostic test module 418. The in-flight diagnostic test module 418 may correspond to the in-flight diagnostic test module 342 of UAV 302.

In various embodiments, the prognostic system 402 includes one or more communication interfaces 420 for exchanging messages with an UAV and other networked devices. The interfaces 420 can include one or more network interface controllers (NICs), I/O interfaces, or other types of transceiver devices to send and receive communications over a network. For simplicity, other components are omitted from the illustrated device. In at least one embodiment, the communication interfaces receive sensor data from the UAV.

Figure 5:
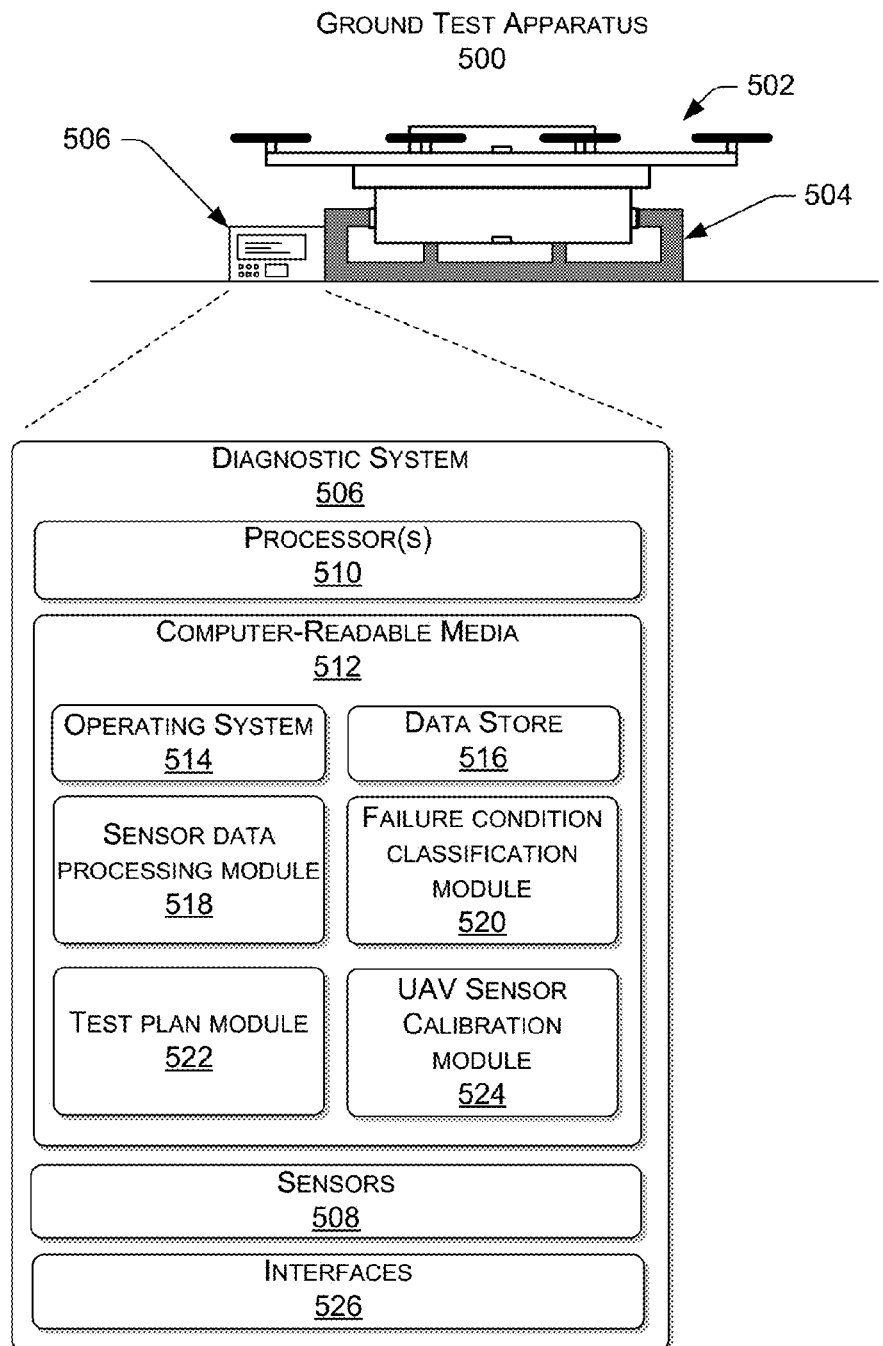
FIG. 5 is a block diagram of a test fixture and test apparatus used to perform diagnostic tests on an unmanned aerial vehicle.

FIG. 5 illustrates a ground test apparatus 500 that may be used to perform ground level testing on all operational parameters of the UAV 502. The UAV 502 may correspond to UAV 108, UAV 202, and UAV 302. In some embodiments, the ground test apparatus 500 may include of a UAV cradle 504 to house the UAV 502, as well as diagnostic system 506. In various examples, the UAV cradle 504 may interface with the inventory attach-points of the UAV 502 or any other physical attach point on the UAV 502. An advantage of the ground test apparatus 500 is that the risk of losing the UAV 502 during an in-flight diagnostic check is eliminated. For example, the ground test apparatus 500 may perform ground level testing that cannot be safely conducted during a flight cycle. Thorough ground level testing of physical system limits can be performed on various physical systems including, the UAV electrical system, power system including the power supply, motor and propeller assemblies including motor controllers, navigation system, and flight controller system. The ground test apparatus 500 may perform a plurality of ground tests including, but not limited to, navigation system checks, flight controller stability checks, power system checks, electric motor and propeller performance checks, and physical structure vibration checks.

In various embodiments, the ground test apparatus 500 can include a plurality of sensors 508. The sensors 524 functionally correspond to the sensors 304 of UAV 302.

In various embodiments, the ground test apparatus 500 may include one or more processor(s) 510 and computer-readable media 512. The one or more processor(s) 510 and the computer-readable media 512 can correspond to the one or more processor(s) 326, 404, and the computer-readable media 328 and 406. The computer-readable media 512 may include an operating system 514 and a data store 516. The data store 514 may store sensor data that is received from the UAV 502 or sensor data that is processed on the ground test apparatus 500 using sensors 508.

In various embodiments, the computer-readable media 512 may include a sensor data processing module 518. The sensor data processing module 518 can correspond to the sensor data processing module 336 or 412.

In various embodiments, the computer-readable media 512 may include a failure condition classification module 520. The failure condition classification module 520 can correspond to the failure classification module 338 or 414.

In various embodiments, the computer-readable media 512 may include a test plan module 522. The test plan module 522 may correspond to the test plan module 340 or 416.

In various embodiments, the computer-readable media 512 may include a UAV sensor calibration module 524. The UAV sensor calibration module 524 may compare ground test sensor data from sensors 508 to sensor data received from UAV sensors 304. In various examples, if a discrepancy is found between sensors 508 and sensors 304, the test plan module 522 may determine that further testing is required to isolate whether the cause of the discrepancy is attributable to sensors 508 or sensors 304.

In various embodiments, the diagnostic system 506 may include one or more communication interfaces 526 for exchanging messages with a UAV and other networked devices. The interfaces 526 can include one or more network interface controllers (NICs), I/O interfaces, or other types of transceiver devices to send and receive communications over a network. For simplicity, other components are omitted from the illustrated device. In at least one embodiment, the communication interfaces receive sensor data from the UAV.

Figure 6:
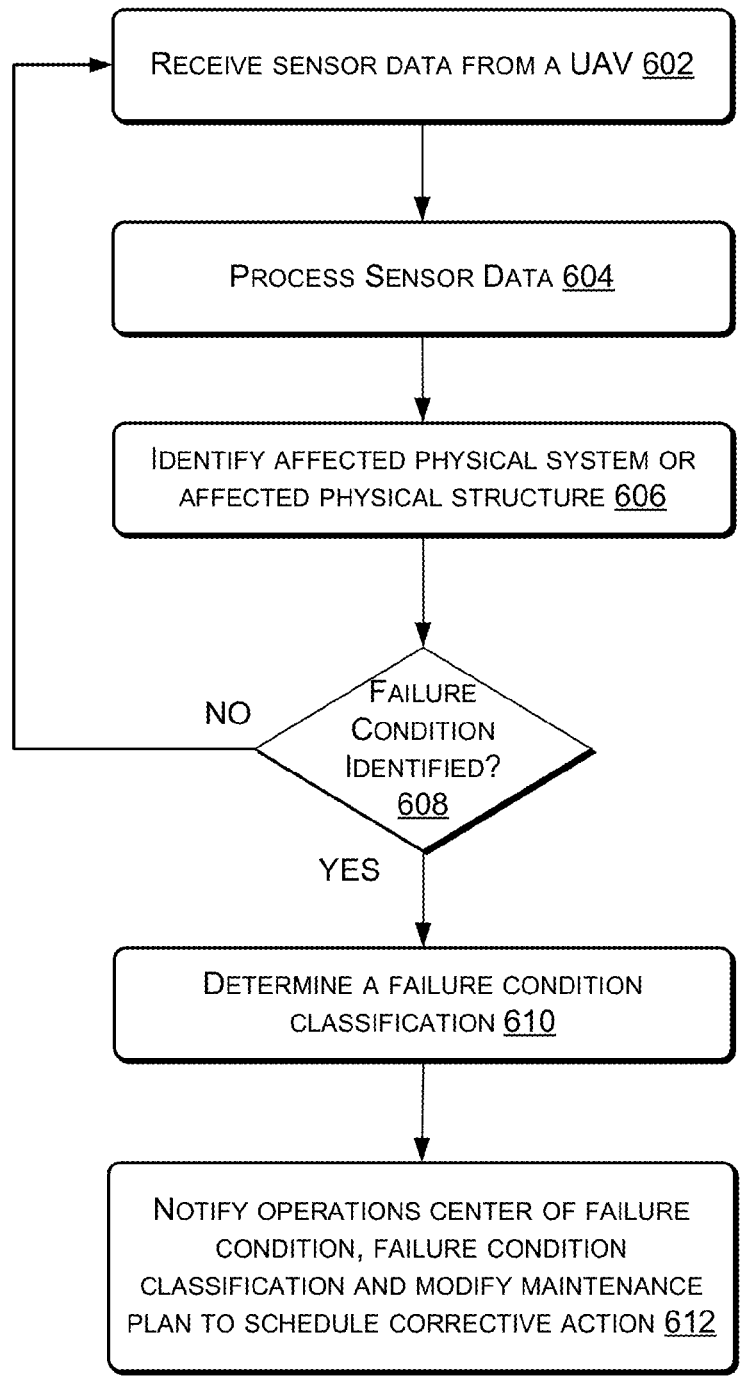
FIG. 6 is a flow diagram of an example process for determining a failure condition classification and notifying an operations center to schedule a corrective action on an unmanned aerial vehicle.

FIG. 6 illustrates an example process for determining a failure condition classification on a UAV and notifying an operations center to schedule a determined corrective action. At 602, the prognostic system receives sensor data from sensors on the UAV. The sensor data may be received by a local prognostic system on the UAV, or a prognostic system that interfaces with a UAV via one or more networks.

At 604, the prognostic system processes the sensor data to determine whether a failure condition is likely to occur. The prognostic system may combine data from different sensor types to determine the likelihood of the failure condition.

At 606, the prognostic system identifies the affected physical system or the affected physical structure. The identification of the affected physical system or the affected physical structure is based on the source of the sensor data.

At 608, the prognostic system determines whether the failure condition is identified. If a failure condition is not identified, the prognostic system continues to process sensor data associated with the UAV.

At 610, if the prognostic system identifies a failure condition, the prognostic system may determine a failure condition classification for the identified failure condition. The failure condition classifications include flight non-critical, flight critical non-priority, or flight critical priority. The failure condition classification is determined using the processed sensor data.

At 612, the prognostic system notifies an operations center of the failure condition, and failure condition classification. The prognostic system may also cause a modification to a maintenance plan associated with the UAV. The maintenance plan modification may include scheduling a corrective action. In various examples, the corrective actions are based at least in part on the failure condition classification. For example, for flight non-critical failure conditions, the corrective action may involve monitoring the affected physical system or affected physical structure over a predetermined time period to ensure that the condition does not worsen. For flight critical failure conditions, the corrective action may likely involve a combination of inspections and the replacement or repair of defective components.

Figure 7:
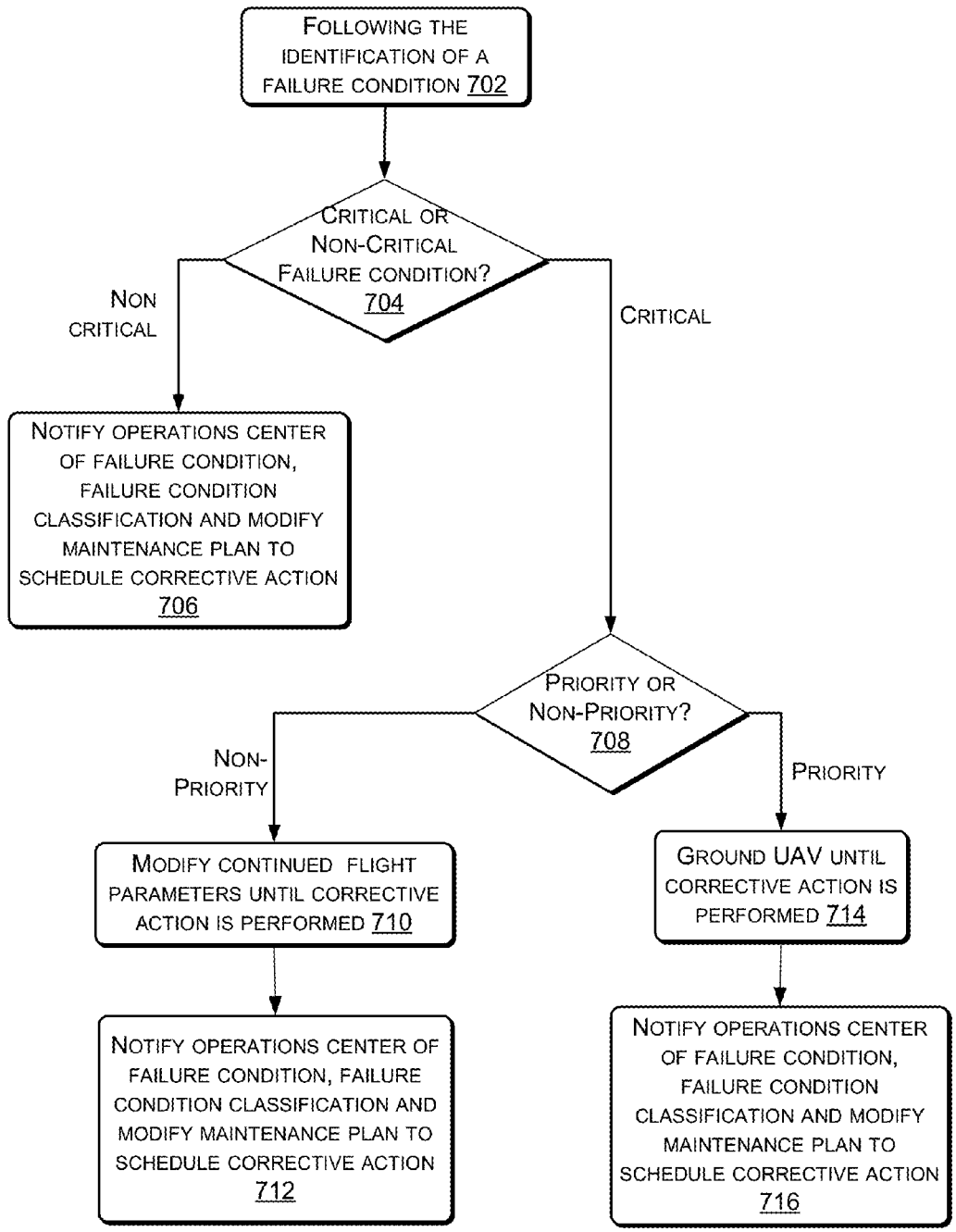
FIG. 7 is a flow diagram of an example process for modifying in-flight parameters of an unmanned aerial vehicle for various failure condition classifications.

FIG. 7 illustrates a process of performing corrective actions associated with various failure condition classifications. For example, the prognostic system is configured to classify an identified failure condition as being one of non-flight critical, flight critical or flight critical priority. Depending on the failure condition classification, the prognostic system may impose operational restrictions on the UAV for the time interval prior to the corrective action being performed.

At 702, the prognostic system has identified a failure condition associated with a UAV.

At 704, the prognostic system determines whether the failure condition classification is flight non-critical or flight critical.

At 706, the failure condition is determined to be flight non-critical. The prognostic system may notify an operations center of the failure condition, and flight non-critical classification. The prognostic system may also cause a modification to a maintenance plan associated with the UAV. The maintenance plan modification may include scheduling a corrective action. In various examples, the corrective action may involve monitoring the affected physical system or affected physical structure over a predetermined time period to ensure that the condition does not worsen. Examples of failure conditions that are classified as flight non-critical may include, but are not limited to, minor detections of corrosion on flight non-critical components, infrequent network dropouts, and infrequent temperature spikes in physical system components that exceed a predetermined operating temperature range.

At 708, the prognostic system determines whether the failure condition classification is flight critical priority or flight critical non-priority.

At 710, the failure condition classification is determined to be flight critical non-priority. In this instance, the prognostic system may impose operational flight restrictions on the UAV until a corrective action has been performed. For example, the prognostic system may restrict the UAV flight envelope (i.e. reduce cruise altitude, reduce cruise speed), imposing an inventory weight limit, or moving all ballast within the UAV towards outermost positions, which reduces maneuverability but increases stability.

At 712, the prognostic system may notify an operations center of the failure condition, and flight critical non-priority classification. The prognostic system may also cause a modification to a maintenance plan associated with the UAV.

The maintenance plan modification may include scheduling a corrective action. For flight critical failure conditions, the corrective action may likely involve a combination of inspections and the replacement or repair of defective components. Examples of failure conditions that are classified as flight critical, non-priority, may include, but are not limited to, landing gear integrity following a hard-landing, calibration of flight control system following a minor in-flight dynamic instability event, or calibration of the navigation system due to minor landing inaccuracies.

At 714, the failure condition classification is determined to be flight critical priority. In this instance, the prognostic system may restrict the UAV from any further flight until a correction has been performed. In some instances, the UAV may be required to perform an emergency landing.

At 716, the prognostic system may notify an operations center of the failure condition, the flight critical priority classification, as well as the location of the UAV in the event it was required to make an emergency landing. The prognostic system may also cause a modification to maintenance plan associated with the UAV. The maintenance plan modification may include scheduling a corrective action. For flight critical failure conditions, the corrective action may likely involve a combination of inspections and the replacement or repair of defective components. Examples of failure conditions that are classified as flight critical priority, may include, but are not limited to, determining that overall CG of the UAV and its inventory is outside an allowable operational range, frequent network dropouts, consistently elevated temperature readings that correspond to an UAV power supply, flight controller or navigation system or CPU processor.

Figure 8:
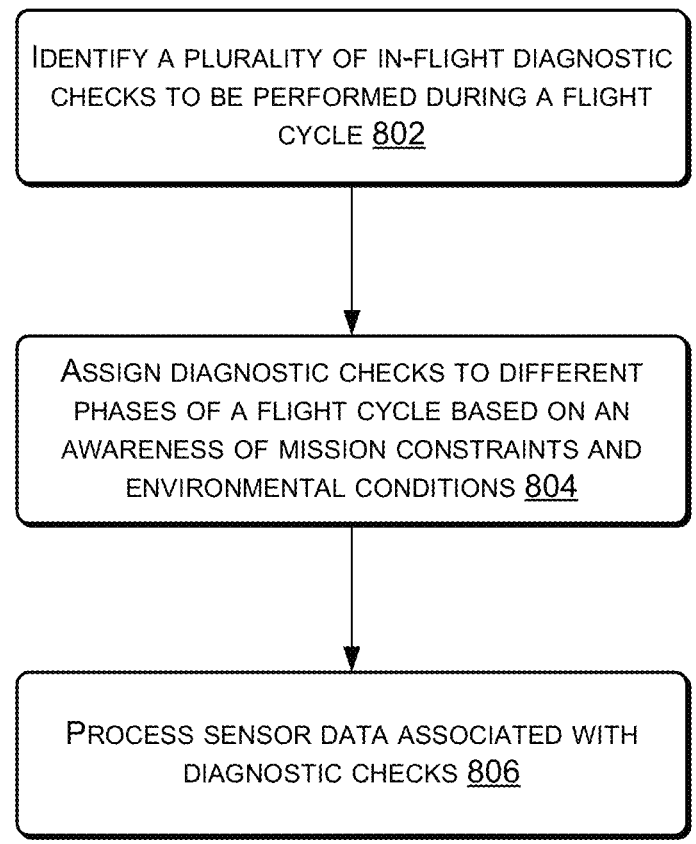
FIG. 8 is a flow diagram of an example process for performing in-flight diagnostic checks on an unmanned aerial vehicle.

FIG. 8 illustrates a flow diagram of an example process for performing in-flight diagnostic checks on a UAV. At 802, the prognostic system identifies a plurality of in-flight diagnostic checks that may be performed during a flight cycle. In-flight diagnostic checks may include, but are not limited to climb tests, full power tests, navigational system checks, or dynamic stability checks performed during climb or cruise phases of flight. In some embodiments, the in-flight diagnostic checks may be required if a failure condition cannot be clearly identified. In other embodiments, the diagnostic checks may be required to identify affected physical systems or affected physical structures. In yet another embodiment, the diagnostic checks may be routine diagnostic checks that are performed during each flight cycle. In some embodiments, a routine diagnostic check may include, but is not limited to, verifying the operation of some or all of the electric motors that power the propellers, or determining that the operational CG of the UAV is within a predetermined CG range.

At 804, diagnostic checks may be assigned to different phases of a flight cycle based on an awareness of mission constraints and environmental conditions. Mission constraints may relate to available energy resources and time, whereas environmental conditions may relate to the weather conditions and terrain contours over which the in-flight diagnostic checks are to be performed.

At 806, the prognostic system processes the sensor data associated with the diagnostic checks. In some embodiments, the prognostic system may process sensor data from one or more sensor types, and identify a failure condition based on the aggregated sensor data. Moreover, a failure condition may be identified by comparing the processed sensor data to historical trends of the same UAV or a fleet of similar UAVs. In various examples, the historical trends identify the normal operating conditions of various physical systems and physical structures of the UAV.

Figure 9:
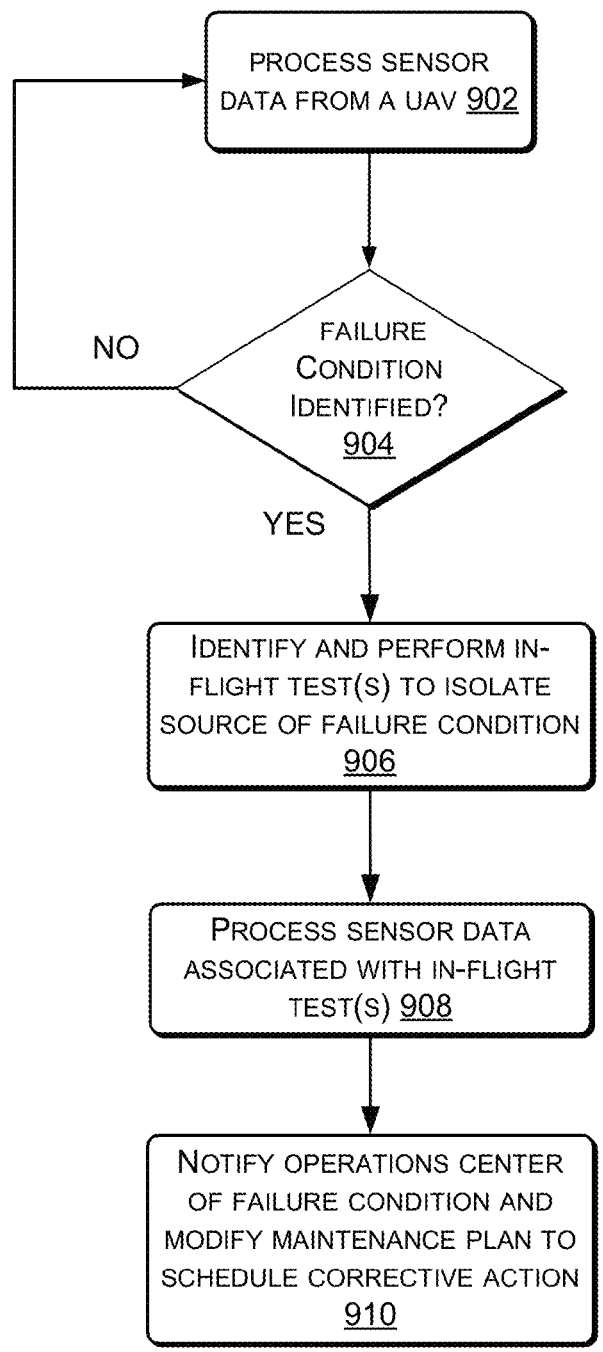
FIG. 9 is a flow diagram of an example process for performing in-flight tests to isolate the source of a failure condition.

FIG. 9 illustrates a flow diagram of an example process for performing in-flight tests to isolate the source of a failure condition. At 902, the prognostic system processes sensor data from a UAV.

At 904, the prognostic system determines whether a failure condition has been identified. In instances, where a failure condition has not been cannot be identified, the prognostic system continues to process sensor data from the UAV.

At 906, the prognostic system identifies a failure condition. In response, the prognostic system identifies and performance a series of flight tests to further isolate the source of the failure condition. The flight tests are performed an awareness of mission constraints and environmental conditions. Mission constraints may relate to available energy resources and time limits, whereas environmental conditions may relate to the weather conditions and terrain contours over which the flight tests are to be performed.

At 908, the prognostic system processes the sensor data associated with the diagnostic checks. The sensor data processing at 908 may correspond to the sensor data processing at 806. In various examples, a failure condition may be identified by comparing the processed sensor data at 908 to historical trends of the same UAV or a fleet of similar UAVs.

At 910, the prognostic system may notify an operations center of the failure condition and flight test results. The prognostic system may also cause a modification to a maintenance plan associated with the UAV to initiate a corrective action. As a non-limiting example, the modification to the maintenance plan may include, but is not limited to, scheduling an inspection or a repair of an affected physical system or an affected physical structure. Inspections may be scheduled at predetermined time intervals until a repair or other corrective action can be performed.

Figure 10:
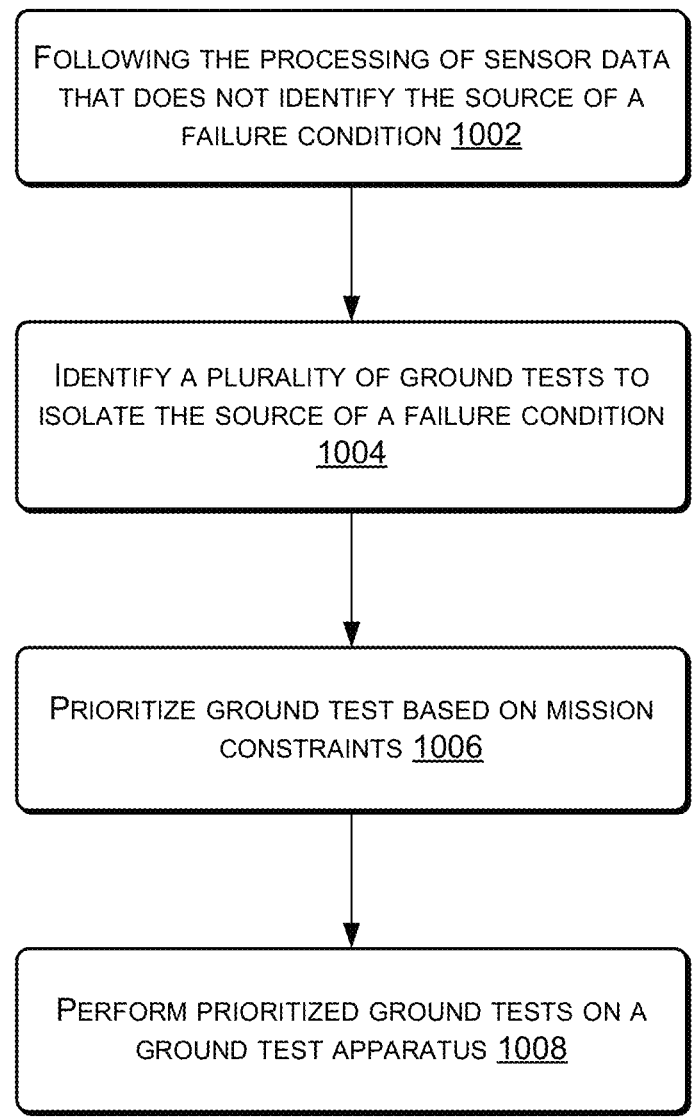
FIG. 10 is a flow diagram of an example process for performing ground tests on an unmanned aerial vehicle.

FIG. 10 illustrates is a flow diagram of an example process for performing ground tests on UAV. At 1002, the prognostic system has processed sensor data but is unable to identify an affected physical system or an affected physical structure.

At 1004, the prognostic system may identify a plurality of ground tests that are intended to identify the affected physical system or an affected physical structure. The plurality of ground tests may include, but are not limited to, navigation system checks, flight controller stability checks, power system checks, electric motor and propeller performance checks, and physical structure vibration checks.

At 1006, the plurality of ground tests is prioritized based on mission constraints of the UAV. For example, the UAV may have a short on-ground turn-around time before its next flight cycle, or inventory delivery. In those instances, the test plan module 340 may prioritize first, the ground tests most likely to identify the affected physical system or affected physical structure.

At 1008, the prioritized ground tests are performed on a ground test apparatus. For example, the UAV may be placed in the UAV cradle 504 shown in FIG. 5 and the UAV may undergo various tests that are prioritized for the UAV in an allotted amount of time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrated forms of implementing the claims.

What is claimed is:

1. A computer implement method comprising:
receiving sensor data from a plurality of sensors associated with an unmanned aerial vehicle (UAV), wherein the receiving occurs during an in-progress phase of a flight cycle of the UAV;
determining that the sensor data indicates a likelihood of a failure condition occurring on a physical structure or a physical system of the UAV during the in-progress phase of the flight cycle, wherein determining the sensor data indicates the likelihood of the failure condition further comprises comparing at least the sensor data to trend data, and wherein the trend data includes historical sensor data from at least one of the UAV, a second UAV, or a fleet of UAVs during normal operating conditions;
determining a failure condition classification based at least in part on the sensor data, the failure condition classification selected from a predetermined set of failure condition classifications that includes at least a flight non-critical classification, a flight critical non-priority classification, and a flight critical priority classification, wherein:
 the flight non-critical classification indicates that the UAV can sustain continued flight without damage to an affected physical structure or an affected physical system,
 the flight critical non-priority classification indicates that the UAV can sustain continued flight with predetermined performance restrictions without damage to an affected physical structure or an affected physical system, and
 the flight critical priority classification indicates that the UAV cannot sustain continued flight without damage to an affected physical structure or an affected physical system;
determining a corrective action during the in-progress phase of the flight cycle based at least on the failure condition classification;
causing a modification to an operational characteristic that is associated with the flight cycle of the UAV based at least in part on the corrective action;
determining a plurality of ground tests to conduct on the UAV at a completion phase of the flight cycle based at least in part on the sensor data;
prioritizing a subset of ground tests from the plurality of ground tests based at least in part on the failure condition classification and on-ground time constraints associated with the UAV; and
transmitting a signal to an operations center, the signal modifying a maintenance plan by scheduling the prioritized subset of ground tests associated with the UAV.

2. The computer-implemented method of claim 1, wherein causing the modification to the operational characteristic includes causing the UAV to operate in a reduced performance mode, wherein the reduced performance mode further includes at least one of restricting an altitude gain per time interval to a predetermined altitude gain per time interval during a climb phase of flight or restricting a cruise speed to a predetermined cruise speed during a cruise phase of flight, the predetermined altitude gain per time interval and the predetermined cruise speed based at least in part on the corrective action.

3. The computer-implemented method of claim 1, wherein the corrective action includes causing the UAV to deposit inventory at a predetermined location before reaching a planned delivery location associated with the inventory.

4. The computer-implemented method of claim 1, wherein the failure condition is the flight critical priority classification, and wherein the corrective action comprises causing the UAV to perform an emergency landing at a geographic location that is proximate to a current location of the UAV.

5. The computer-implemented method of claim 1, wherein the corrective action corresponding to the flight critical non-priority classification includes:
inspecting the physical structure or the physical system at reduced time intervals until maintenance is performed; and
reducing allowable cruise altitude or reducing allowable cruise speed.

6. The computer-implemented method of claim 1, wherein the sensor data comprises strain gauge sensor data and the method further comprising:
determining an in-flight vibration frequency of the physical structure based at least in part on the strain gauge sensor data; and
wherein the determining the likelihood of the failure condition occurring on the physical structure is based at least in part on a comparison of the in-flight vibration frequency and a vibration frequency threshold.

7. The computer-implemented method of claim 6, wherein trend data includes the historical trend of operational vibration frequencies that correspond to the physical structure of the UAV, and wherein the vibration frequency threshold is based at least in part on the trend data.

8. The computer-implemented method of claim 1, wherein the plurality of sensors includes at least an accelerometer, a gyroscope, a proximity sensor, a digital camera, a global position system (GPS) sensor, a temperature sensor, a moisture sensor, a voltage sensor, a current sensor or a strain gauge.

9. The computer-implemented method of claim 1, wherein the physical system includes at least one of an electrical system, a power system, a navigation system, a flight controller system, an inertial measurement unit, or a motor-propeller assembly.

10. A unmanned aerial vehicle (UAV) comprising:
an airframe;
physical systems coupled to the airframe, the physical systems comprising at least a propulsion system to provide thrust, a control system to control at least the propulsion system, and a power system to power at least the control system and the propulsion system;
a plurality of sensors distributed throughout the airframe and the physical systems, the plurality of sensors configured to monitor at least the operation of the airframe and the physical systems; and
a diagnostic controller to process sensor data associated with the plurality of sensors, the diagnostic controller performing acts comprising:
 receive sensor data from a plurality of sensors during an in-progress phase of a flight cycle of the UAV;
 determine that the sensor data indicates a probability of a failure condition occurring on the airframe or at least one of the physical systems;
 determine a failure condition classification based at least in part on the sensor data, the failure condition classification selected from a predetermined set of failure condition classifications that includes at least one of a flight non-critical classification, a flight critical non-priority classification, and a flight critical priority classification;

determine a corrective action during the in-progress phase of the flight cycle based at least on the failure condition classification;

cause a modification to an operational characteristic that is associated with the flight cycle of the UAV based at least in part on the corrective action;

determine a plurality of ground tests to conduct on the UAV at a completion phase of the flight cycle based at least in part on the sensor data;

prioritize a subset of ground tests from the plurality of ground tests based at least in part on the failure condition classification and on-ground time constraints associated with the UAV; and transmit a signal to an operations center, the signal modifying a maintenance plan by scheduling the prioritized subset of ground tests associated with the UAV.

11. The UAV of claim 10, wherein the corrective action includes causing the UAV to deposit inventory at a predetermined location before reaching a planned delivery location associated with the inventory.

12. The UAV of claim 10, wherein the corrective action includes causing the UAV to reduce altitude gain per time interval to a predetermined altitude gain per time interval during a climb phase of flight or to reduce cruise speed to a predetermined cruise speed during a cruise phase of flight.

13. The UAV of claim 10, wherein:
the flight non-critical classification indicates the UAV can sustain continued flight without damage to an affected physical structure or an affected physical system;
the flight critical non-priority classification indicates the UAV can sustain continued flight with predetermined performance restrictions without damage to an affected physical structure or an affected physical system; and
the flight critical priority classification indicates the UAV cannot sustain continued flight without damage to an affected physical structure or an affected physical system.

14. The UAV of claim 10, wherein the sensor data comprises strain gauge sensor data and the diagnostic controller further performing acts to:
determine an in-flight vibration frequency of the physical structure based at least in part on the strain gauge sensor data; and
wherein determining the probability of the failure condition occurring on the physical structure is based at least in part on the in-flight vibration frequency with respect to a vibration frequency threshold.

15. The UAV of claim 14, wherein the vibration frequency threshold is based at least in part on historical trends of operational vibration frequencies that correspond to the physical structure of the UAV.

16. A system comprising:
one or more processors; and
memory to store computer-executable instructions that, when executed, cause the one or more processors to perform acts comprising:
receiving sensor data from a plurality of sensors during an in-progress phase of a flight cycle of an unmanned aerial vehicle (UAV);

determining that the sensor data indicates a probability of a failure condition occurring on the airframe or at least one of the physical systems during the in-progress phase of the flight cycle, wherein determining the sensor data indicates the likelihood of the failure condition further comprises comparing at least the sensor data to trend data that includes historical sensor data from at least one UAV;

determining a failure condition classification based at least in part on the sensor data, the failure condition classification selected from a predetermined set of failure classifications, each of the predetermined failure classifications having at least a predetermined flight plan modification;

causing a modification to a flight plan that is associated with the flight cycle of the UAV based at least in part on the failure condition classification; and determining a plurality of ground tests to conduct on the UAV at a completion of the flight cycle based at least in part on the sensor data; and prioritizing a subset of ground tests from the plurality of ground tests based at least in part on the failure condition classification and on-ground time constraints associated with the UAV.

17. The system of claim 16, wherein the acts further comprise transmitting a signal to an operations center, the signal modifying a maintenance plan by scheduling the prioritized subset of ground tests associated with the UAV.

18. The system of claim 16, wherein the sensor data comprises strain gauge sensor data and wherein the acts further comprise:
determining an in-flight vibration frequency of the physical structure based at least in part on the strain gauge sensor data; and
wherein the determining the probability of the failure condition occurring on the physical structure is based at least in part on a comparison of the in-flight vibration frequency and a vibration frequency threshold.

19. The system of claim 16, wherein the plurality of sensors includes at least an accelerometer, a gyroscope, a proximity sensor, a digital camera, a global position system (GPS) sensor, a temperature sensor, a moisture sensor, a voltage sensor, a current sensor or a strain gauge.

20. The computer-implemented method of claim 1, wherein the UAV includes at least two drive units, each drive unit including an electric motor coupled to a propeller and structured to provide thrust to propel the UAV, and wherein the sensor data comprises strain gauge sensor data and the method further comprising:
determining an in-flight thrust level provided by each of the drive units based at least in part on the strain gauge sensor data;
comparing the in-flight thrust level of each of the drive units; and
determining, based at least in part on the comparing, an asymmetrical thrust condition in which one drive unit produces an in-flight thrust level different than the in-flight thrust level of another drive unit, wherein a difference in thrust level is outside of a predetermined range.

* * * * *